I

(12) United States Patent
Regenscheit

(10) Patent No.: US 10,428,905 B2
(45) Date of Patent: Oct. 1, 2019

(54) POWERSHIFT MULTISPEED REVERSING TRANSMISSION

(71) Applicant: ZF Friedrichshafen AG, Friedrichshafen (DE)

(72) Inventor: Norman Regenscheit, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 267 days.

(21) Appl. No.: 15/464,859

(22) Filed: Mar. 21, 2017

(65) Prior Publication Data

US 2017/0314645 A1   Nov. 2, 2017

(30) Foreign Application Priority Data

Apr. 28, 2016   (DE) .................. 10 2016 207 299

(51) Int. Cl.

| F16H 3/093 | (2006.01) |
|---|---|
| F16H 3/00 | (2006.01) |
| F16H 3/10 | (2006.01) |
| F16H 37/04 | (2006.01) |
| F16H 3/14 | (2006.01) |
| F16H 45/02 | (2006.01) |
| F16H 47/00 | (2006.01) |
| F16H 47/06 | (2006.01) |

(52) U.S. Cl.
CPC .............. *F16H 3/093* (2013.01); *F16H 3/14* (2013.01); *F16H 45/02* (2013.01); *F16H 47/00* (2013.01); *F16H 47/06* (2013.01); *F16H 2003/0935* (2013.01); *F16H 2200/0052* (2013.01); *F16H 2200/0091* (2013.01)

(58) Field of Classification Search
CPC . F16H 3/093; F16H 3/006; F16H 3/10; F16H 37/043; F16H 2003/007
USPC .............................................. 74/331
See application file for complete search history.

(56) References Cited

U.S. PATENT DOCUMENTS

| 5,249,475 A * | 10/1993 | McAskill ................ F16H 3/093 |
|---|---|---|
| | | 74/331 |
| 5,388,450 A * | 2/1995 | Hurth ...................... F16H 47/02 |
| | | 180/307 |
| 5,592,853 A * | 1/1997 | Rebholz ................... F16H 3/093 |
| | | 192/112 |
| 5,743,142 A * | 4/1998 | Leber ....................... F16H 3/093 |
| | | 74/325 |
| 5,819,587 A * | 10/1998 | Leber ....................... F16H 3/093 |
| | | 74/331 |
| 7,395,728 B2 * | 7/2008 | Regenscheit ........... F16H 3/093 |
| | | 74/331 |

(Continued)

FOREIGN PATENT DOCUMENTS

DE   44 16 930 A1   11/1995

OTHER PUBLICATIONS

German Search Report Corresponding to 10 2016 207 299.4 dated Nov. 25, 2016.

*Primary Examiner* — Ha Dinh Ho
(74) *Attorney, Agent, or Firm* — Michael J. Bujold

(57) ABSTRACT

A powershifting multispeed reversing transmission includes a converter lockup clutch (31) arranged in a space (13) provided by arranging the forward-driving clutch (8) between the fixed gear (5) and the loose gear (7) on a forward-driving shaft, and the reverse-driving clutch (12) between the fixed gear (9) and the loose gear (11) a reverse-driving shaft.

13 Claims, 6 Drawing Sheets

(56) References Cited

U.S. PATENT DOCUMENTS

| | | | | |
|---|---|---|---|---|
| 7,421,920 B2 * | 9/2008 | Regenscheit | ............ | F16H 3/093 |
| | | | | 74/331 |
| 8,033,194 B2 * | 10/2011 | Suzuki | .................... | F16H 3/093 |
| | | | | 74/331 |
| 8,424,403 B2 * | 4/2013 | Muhlbach | ............... | F16H 3/093 |
| | | | | 74/331 |

* cited by examiner

POWERSHIFT MULTISPEED REVERSING TRANSMISSION

This application claims priority from German patent application serial no. 10 2016 207 299.4 filed Apr. 28, 2016.

FIELD OF THE INVENTION

The invention concerns a powershift multispeed reversing transmission.

BACKGROUND OF THE INVENTION

Powershifting multispeed reversing transmissions of the type concerned are used in working machines such as telehandlers or backhoe loaders and in smaller wheel loaders. In these vehicles the structural space above the driveshaft of the drive engine is needed for superstructures and for the cabin of the vehicle. However, in order to leave enough ground clearance a particular distance between the drive shaft and the drive output shaft of the transmission has to be maintained. Depending on their use, in vehicles of this type the drive engine in the vehicle is positioned at the rear or centrally, as is the case for example in smaller wheel loaders and also telehandlers.

Frequently, the drive-trains of such vehicles include a hydrodynamic torque converter, which can have a so-termed converter lockup clutch in order to improve efficiency in the drive-train.

DE4416930A1 discloses a powershifting reversing transmission with a converter lockup clutch arranged therein, which connects the pump impeller wheel to the turbine wheel. However, due to the arrangement of the clutches and shafts, this transmission is not suitable for smaller wheel loaders and telehandlers because it takes up considerable axial length.

SUMMARY OF THE INVENTION

The purpose of the present invention is to provide a powershifting reversing transmission that takes up little axial length, allows the possibility of incorporating a converter lockup clutch, and leaves sufficient room for the arrangement of a cabin above the driveshaft.

This objective is achieved with a powershifting transmission of the type concerned which also embodies the characterizing features specified in the principal claim. According to the invention, the powershifting multispeed reversing transmission has an input shaft that can be connected to a drive engine, for example an internal combustion engine. Coaxially with the input shaft is arranged a drive shaft which is functionally connected to the input shaft. When a hydrodynamic torque converter is used, the input shaft is connected in a rotationally fixed manner to the pump impeller wheel, and the drive shaft is connected in a rotationally fixed manner to the turbine wheel. However, the transmission can also be designed without the hydrodynamic torque converter, and in that case the input shaft is connected in a rotationally fixed manner to the drive shaft. A fixed gear is connected in a rotationally fixed manner to the driveshaft and meshes with a fixed gear on the shaft for forward driving and with a fixed gear on the shaft for driving in reverse. The fixed gear on the drive shaft is arranged close to the hydrodynamic torque converter. A clutch is arranged on the shaft for forward driving between the fixed gear and a loose wheel, and on the shaft for reverse driving a clutch is also arranged between the fixed gear and the loose wheel. This produces some fitting space between the clutch for forward driving and the clutch for reversing, into which a so-termed converter lockup clutch can be fitted inside the transmission on the drive shaft. This converter lockup clutch connects the input shaft to the drive shaft and, if a hydrodynamic torque converter is present, the pump impeller wheel to the turbine wheel. Since the converter lockup clutch is arranged at the height level of the clutches for forward and for reverse driving, the axial length of the transmission is not increased. Since the fixed gear on the drive shaft meshes with the fixed gear on the forward driving shaft and with the fixed gear on the reverse driving shaft, all the other shafts can be arranged below the drive shaft, so that above the drive shaft enough room remains, for example, for a cabin. The required flexibility in the axial distance from the drive shaft to the drive output shaft is achieved by varying the distance between the forward and reverse driving shafts. The other shafts are located under the shafts for forward and reverse driving.

BRIEF DESCRIPTION OF THE DRAWINGS

Further features emerge from the description of the figures, which show.

DETAILED DESCRIPTION OF THE PREFERRED EMBODIMENTS

Figure 1:
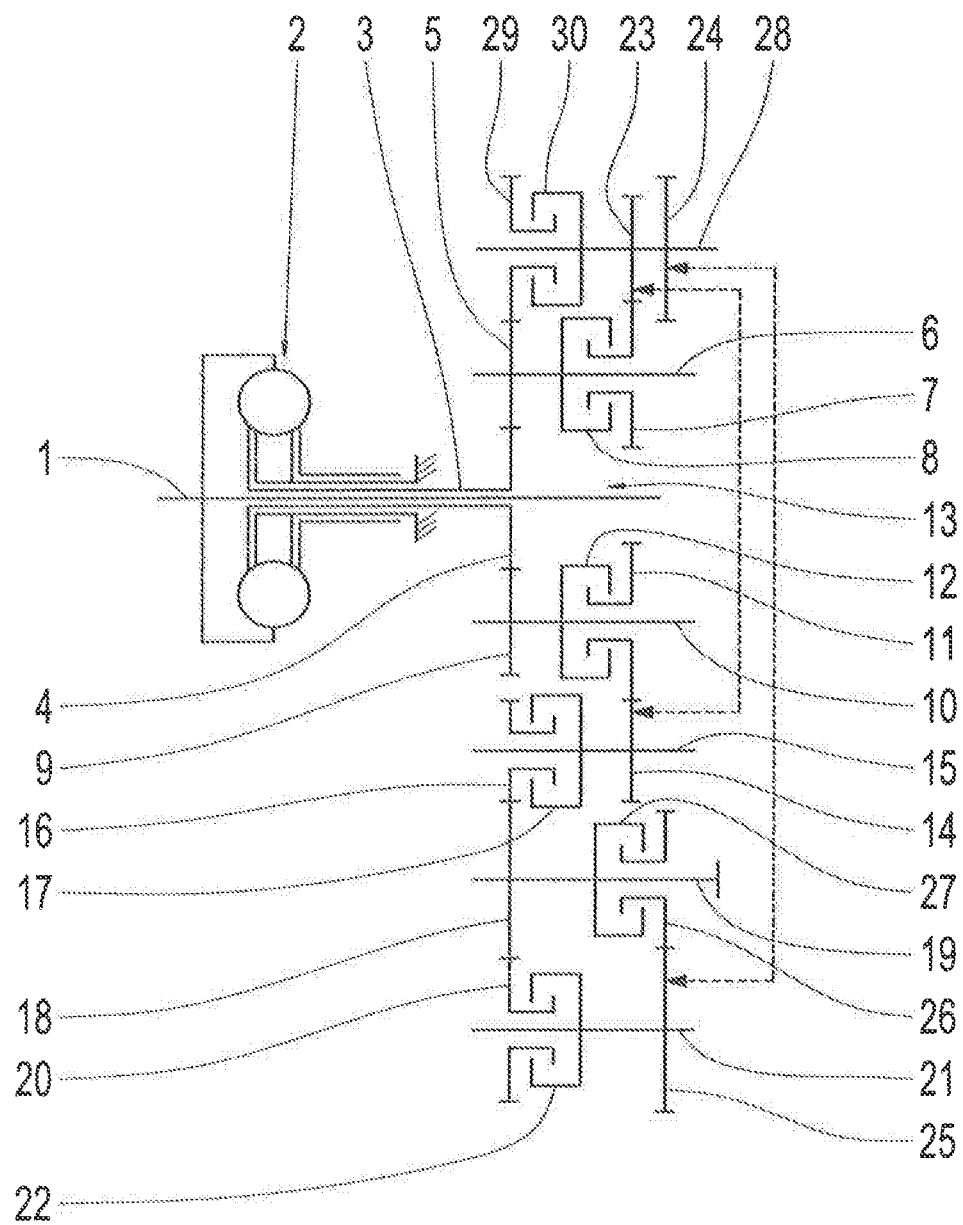
FIG. 1: A transmission layout according to the invention, with six forward gears and three reverse gears, without a converter lockup clutch

FIG. 1.

A drive engine (not shown), for example an internal combustion engine, drives the input shaft 1 of the transmission. The input shaft 1 is connected in a rotationally fixed manner to the pump impeller wheel of the hydrodynamic torque converter 2. The turbine wheel of the hydrodynamic torque converter 2 is connected in a rotationally fixed manner to the drive shaft 3. The drive shaft 3 is preferably in the form of a hollow shaft. The drive shaft 3 rotates about a rotational axis (not shown). The fixed gear 4 is connected in a rotationally fixed manner to the drive shaft 3. 'Fixed gear' means that the gearwheel is connected in a rotationally fixed manner to the shaft or is made integrally with the shaft. The fixed gear 4 meshes with the fixed gear 5, the fixed gear 5 is connected in a rotationally fixed manner to the shaft 6 for forward driving. On the forward driving shaft 6 is mounted to rotate a loose wheel 7, where 'loose wheel' means that the gearwheel is fitted onto a shaft in such manner that it can rotate. By means of the forward-driving clutch 8 the loose wheel 7 can be connected in a rotationally fixed manner to the forward-driving shaft 6. The fixed gear 4 meshes with the fixed gear 9, which is connected in a rotationally fixed manner to the shaft 10 for reverse driving. The loose wheel 11 is mounted to rotate on the reverse-driving shaft 10 and can be connected to it in a rotationally fixed manner by means of the reverse-driving clutch 12. The forward-driving clutch 8 is positioned between the fixed gear 5 and the loose wheel 7, the reverse-driving clutch 12 is positioned between the fixed gear 9 and the loose wheel 11, and the fixed gear 4, the fixed gear 5 and the fixed gear 9 are arranged close to the hydrodynamic torque converter 2 and thus on the side of the transmission facing toward the drive engine, whereby a space 13 is formed between the forward-driving clutch 8 and the reverse-driving clutch 12, and within the space a converter lockup clutch can be arranged if desired. The loose wheel 11 meshes with the fixed gear 14 arranged on the shaft 15. The loose wheel 16 is also arranged on the shaft 15 and can be connected to the shaft 15 by means of the clutch 17 for first gear. The loose wheel 16 meshes with the fixed gear 18, which is connected in a rotationally fixed manner to the drive output shaft 19. The drive output shaft 19 drives a vehicle axle (not shown) of the vehicle. The fixed gear 18 meshes with the loose wheel 20, which is mounted to rotate on the shaft 21 and can be connected to the shaft 21 by the clutch for second gear. The fixed gear 14 meshes with the fixed gear 23 and the fixed gear 24 meshes with the fixed gear 25. The loose wheel 26 meshes with the fixed gear 25 and can be connected to the drive output shaft 19 by means of the clutch 27 for third gear. The fixed gears 23 and 24 are arranged on the shaft 28, on which the loose wheel 29 is also mounted to rotate. The loose wheel 29 can be connected to the shaft 28 by means of the clutch 30 for fourth gear.

Figure 2:
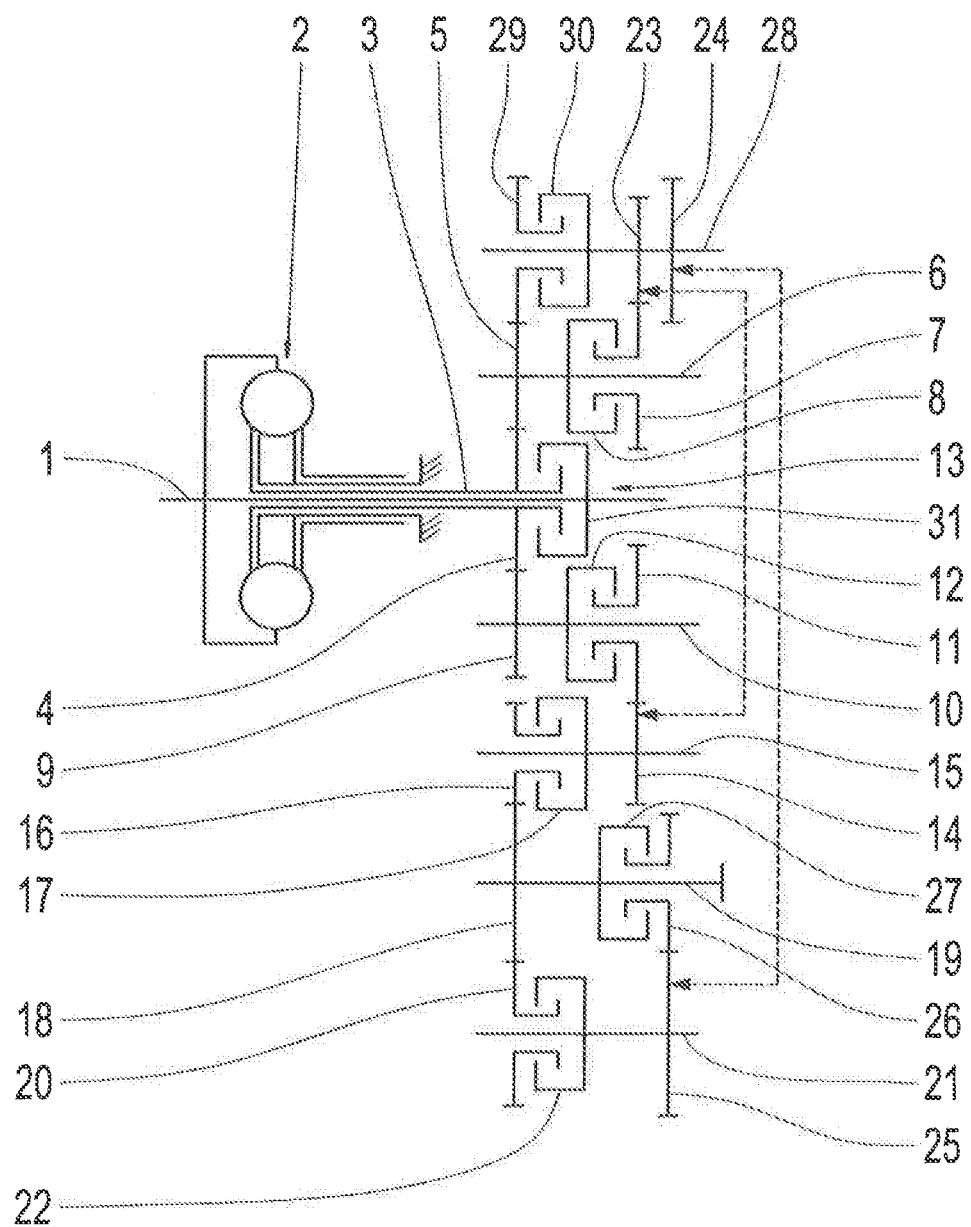
FIG. 2: The transmission layout of FIG. 1, with a converter lockup clutch

FIG. 2:

The transmission layout shown in FIG. 2 is identical to the transmission layout in FIG. 1 except for the converter lockup clutch 31. The converter lockup clutch 31 is arranged in the space 13, and by means of the converter lockup clutch 31, the input shaft 1 can be connected to the drive shaft 3 in order to bypass the hydrodynamic torque converter. Since the converter lockup clutch 31 is in the space 13, the axial length of the transmission is not increased and the transmission can therefore be made either with or without a converter lockup clutch 31.

Figure 3:
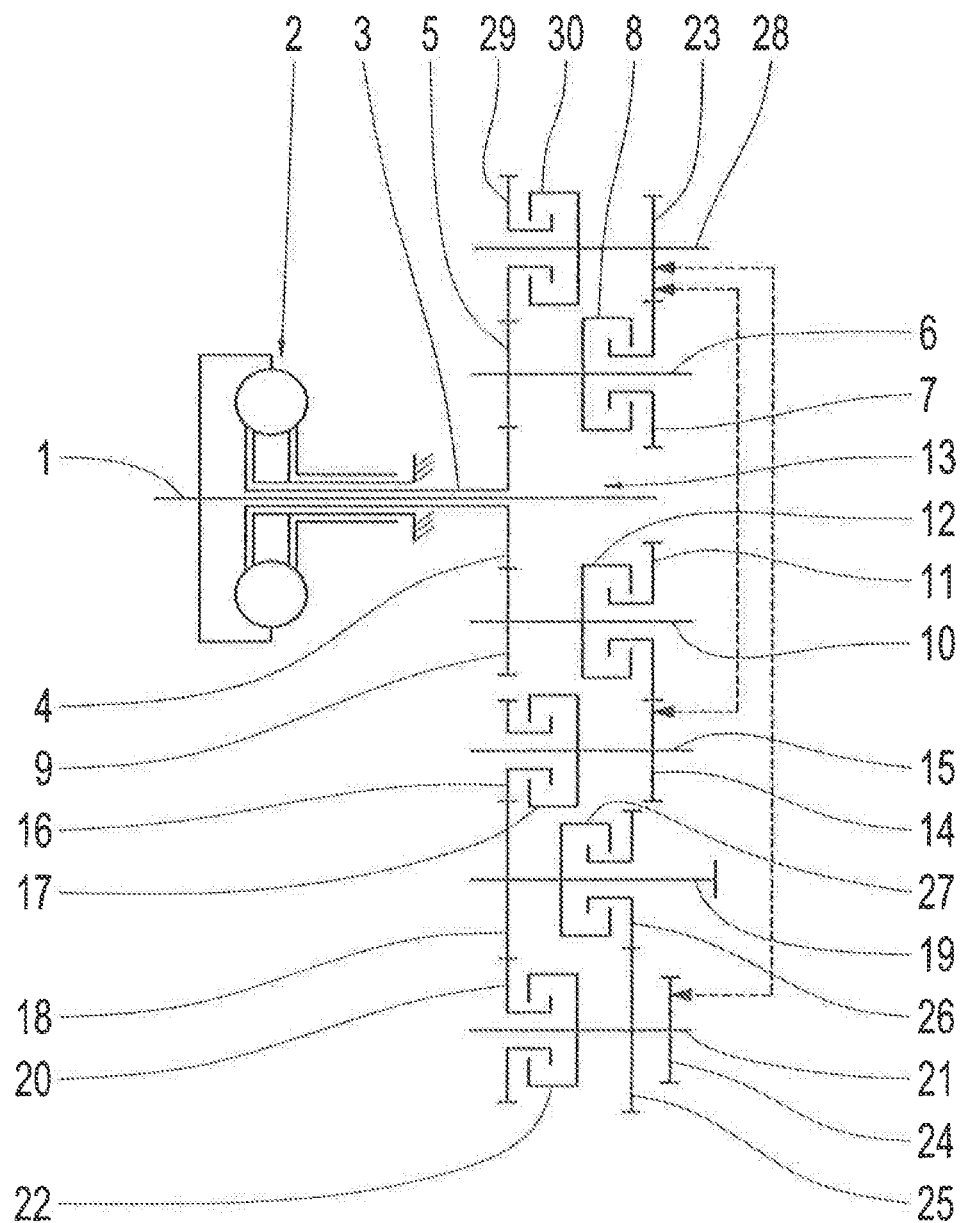
FIG. 3: A transmission layout according to the invention, with six forward gears and three reverse gears, without a converter lockup clutch

FIG. 3:

FIG. 3 differs from FIG. 1 in that the fixed gear 24 is connected in a rotationally fixed manner to the shaft 28 in FIG. 1, whereas the fixed gear 24 is connected in a rotationally fixed manner to the shaft 21 in FIG. 3. Consequently, in FIG. 1 the fixed gear 24 meshes with the fixed gear 25 whereas in FIG. 3 the fixed gear 24 meshes with the fixed gear 23. The other arrangements of the gearwheels and their engagements are identical.

Figure 4:
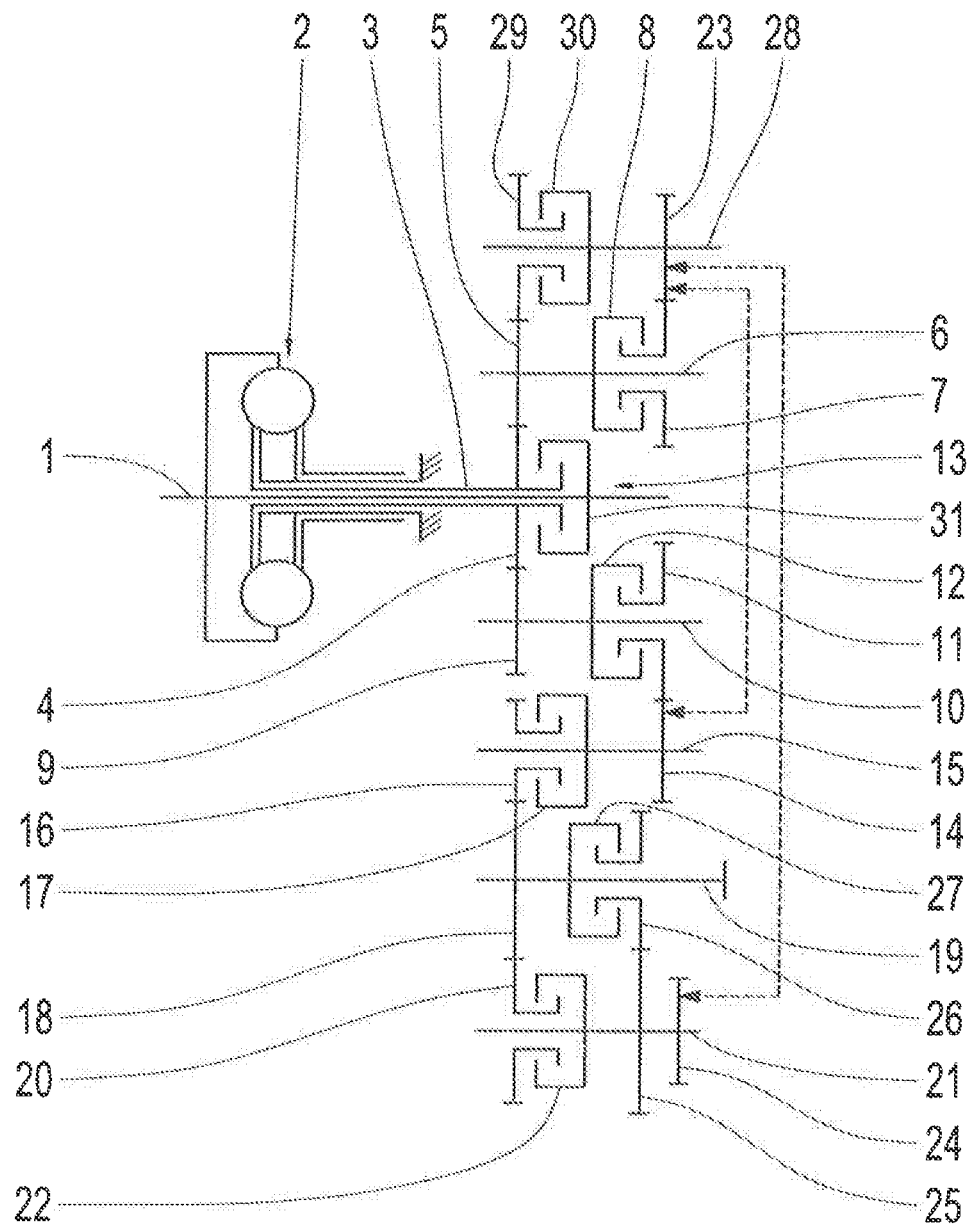
FIG. 4: The transmission layout of FIG. 3, with a converter lockup clutch

FIG. 4:

The design according to FIG. 4 is identical to the design according to FIG. 3, except that in FIG. 4 the converter lockup clutch 31 is arranged in the space 13. As in FIG. 2, the converter lockup clutch 31 in FIG. 4 can be functionally connected to the input shaft 1 and the drive shaft 3.

FIG. 5:

In the vehicle, the vehicle cabin 32 requires installation space above the input shaft 1. By virtue of the transmission layout according to the invention, the shafts 6, 10, 15, 19, 21 and 28 can be positioned under the input shaft 1 so that a sufficient amount of structural space is available for the vehicle cabin. Since the forward-driving shaft 6 and the reverse-driving shaft 10 are arranged laterally and almost at the same level as the input shaft 1, the axial distance between the input shaft 1 and the drive output shaft 19 can be made smaller, for example 450 mm.

Figure 5:
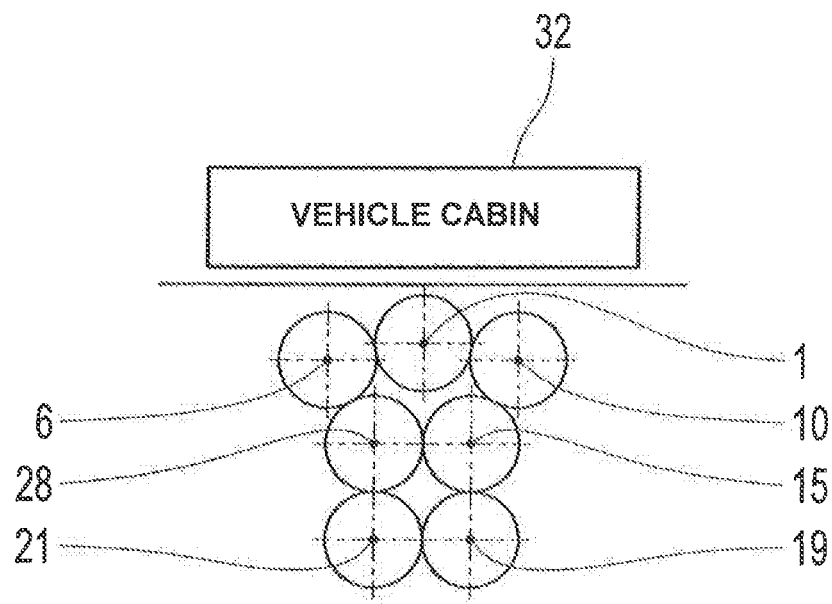
FIG. 5: The arrangement of the gearwheels for producing a small axial distance between the drive shaft and the drive output shaft in the above transmission layout
Figure 6:
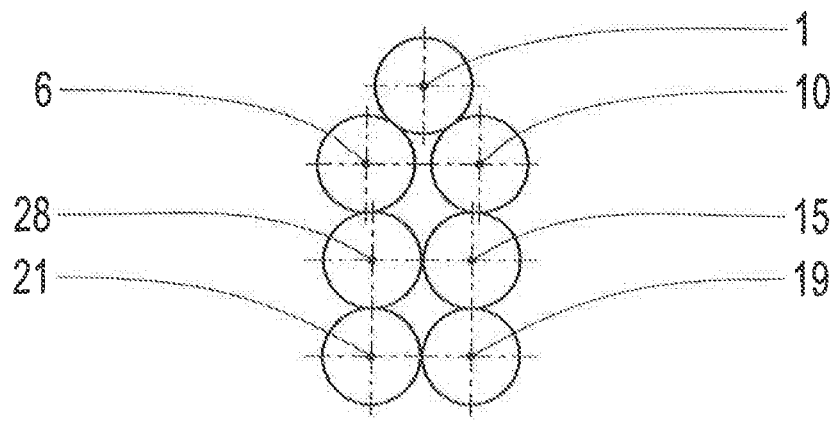
FIG. 6: The arrangement of the gearwheels for producing a larger axial distance between the drive shaft and the drive output shaft in the above transmission layout.
Figure 7:
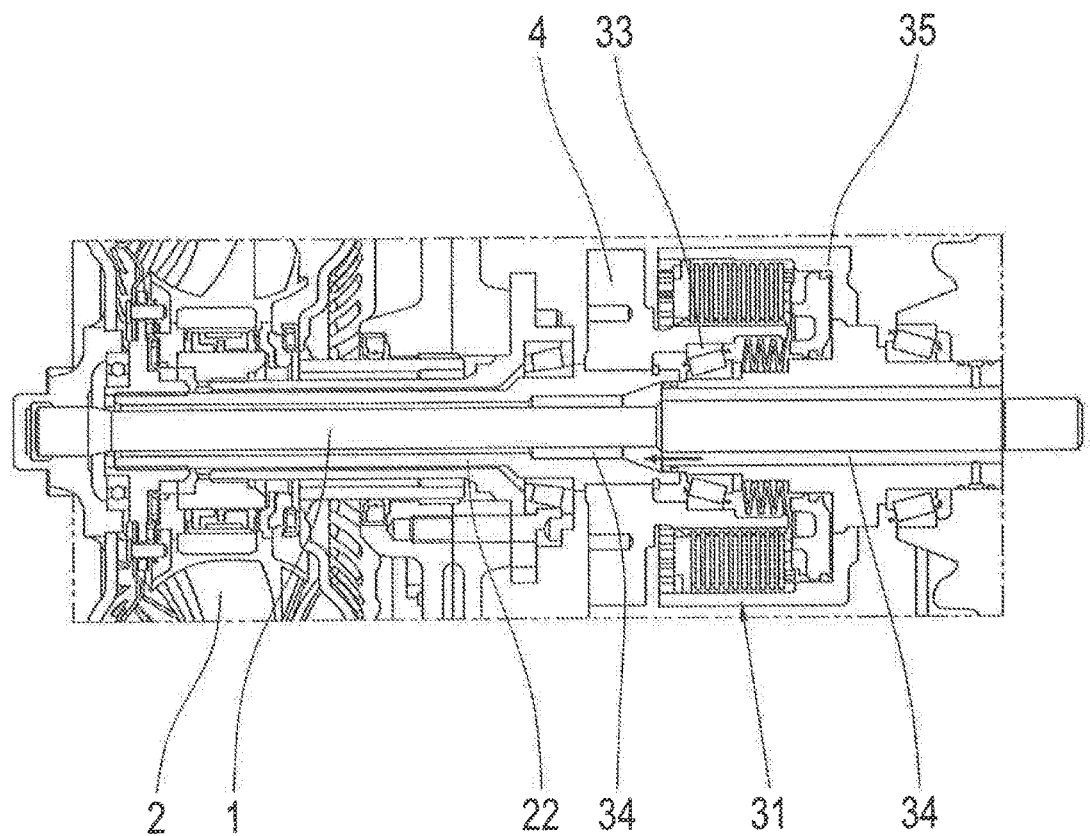
FIG. 7: A section of a design form of the arrangement of the converter lockup clutch.

FIG. 6:

To produce a larger axial distance in the arrangement according to FIG. 5, the forward-driving shaft 6 and the reverse-driving shaft 10 are not arranged almost at the same height level as the input shaft 1 as in FIG. 5, but are axially a larger distance away from the input shaft 1. This makes it possible to increase the axial distance up to 500 mm.

FIG. 7:

To be able to fit the converter lockup clutch 31 in a space-saving manner and to enable the hydrodynamic torque converter 2 to be supplied with sufficient lubricant and coolant, the input shaft 1 is arranged inside the drive shaft 3 in such manner that there is a gap between the input shaft 1 and the drive shaft 3. The fixed gear 4 is made integrally with the inner disk carrier of the converter lockup clutch 31 and mounted by means of a bearing 33 on the input shaft 1. The coolant and lubricant medium passes to the hydrodynamic torque converter through the bore 34. The outer disk carrier 35 is connected to the input shaft 1 in a rotationally fixed manner.

INDEXES

1 Input shaft
2 Hydrodynamic torque converter
3 Drive shaft
4 Fixed gear
5 Fixed gear
6 Forward-driving shaft
7 Loose wheel
8 Forward-driving clutch
9 Fixed gear
10 Reverse-driving shaft
11 Loose wheel
12 Reverse-driving clutch
13 Space
14 Fixed gear
15 Shaft
16 Loose wheel
17 Clutch for the first gear
18 Fixed gear
19 Drive output shaft
20 Loose wheel
21 Shaft
22 Clutch for the second gear
23 Fixed gear
24 Fixed gear
25 Fixed gear
26 Loose wheel
27 Clutch for the third gear
28 Shaft
29 Loose wheel
30 Clutch for the fourth gear
31 Converter lockup clutch
32 Vehicle cabin
33 Bearing
34 Bore
35 Outer disk carrier

The invention claimed is:

1. A powershifting multispeed reversing transmission comprising:
   an input shaft that can be driven by a drive engine,
   the input shaft being in functional connection with a drive shaft that is arranged coaxially and is rotatable about a rotational axis, a fixed gear being connected to the drive shaft in a rotationally fixed manner, the fixed gear meshing with a fixed gear that is connected, in a rotationally fixed manner, to a forward-driving shaft and, at the same time, the fixed gear meshing with a fixed gear that is connected, in a rotationally fixed manner, to a reverse-driving shaft, the forward-driving shaft being connectable in a rotationally fixed manner, via a forward-drive clutch for forward driving, to a loose gear, the reverse-driving shaft being connectable in a rotationally fixed manner, via a reverse-drive clutch for reverse driving, to a loose gear, and in a direction of the rotational axis of the drive shaft, the forward-drive clutch being arranged on the forward-driving shaft, between the fixed gear on the forward-driving shaft and the loose gear, and, in the direction of the rotational axis of the drive shaft, the reverse-drive clutch being arranged on the reverse-driving shaft, between the fixed gear and the loose gear such that a fitting space is produced, on the drive shaft, close to the fixed gear in which a converter lockup clutch is accommodable.

2. The powershifting multispeed reversing transmission according to claim 1, wherein the input shaft is connected to a pump impeller wheel of a hydrodynamic torque converter and the drive shaft is connected to a turbine wheel of the hydrodynamic torque converter, and the converter lockup clutch, for connecting the input shaft to the drive shaft, is arranged on the drive shaft.

3. The powershifting multispeed reversing transmission according to claim 1, wherein further shafts with respective further clutches are arranged parallel to the drive shaft, and the forward-driving clutch, the reverse-driving clutch and the further clutches facilitate engagement of six gears in a forward driving direction and three gears in a reverse driving direction.

4. The powershifting multispeed reversing transmission according to claim 3, wherein when the transmission is fitted into a vehicle, the drive shaft is arranged farthest away from a surface on which the vehicle is standing and all of the forward-driving shaft, the reverse-driving shaft and the further shafts are arranged closer to the surface on which the vehicle is supported.

5. The powershifting multispeed reversing transmission according to claim 3, wherein only one clutch is arranged on each of the shafts.

6. The powershifting multispeed reversing transmission according to claim 2, wherein a distance between a drive output shaft, for driving the vehicle wheels, and the drive shaft is between 450 mm and 500 mm.

7. The powershifting multispeed reversing transmission according to claim 3, wherein the transmission is made with the converter lockup clutch for connecting the input shaft to the drive shaft.

8. The powershifting multispeed reversing transmission according to claim 4, wherein the loose gear that is connectable, via the forward-driving clutch, to the forward-driving shaft in a rotationally fixed manner meshes with a fixed gear which is connected, in a rotationally fixed manner, to a shaft on which a clutch for the fourth gear is arranged.

9. The powershifting multispeed reversing transmission according to claim 8, wherein two fixed gears and one loose gear are arranged on the shaft on which the clutch for the fourth gear is arranged such that the loose gear meshes with the fixed gear on the forward-driving shaft.

10. The powershifting multispeed reversing transmission according to claim 8, wherein only one fixed gear and one loose gear are arranged on the shaft on which the clutch for the fourth gear is arranged, and the loose gear meshes with the fixed gear on the forward-driving shaft.

11. A powershifting multispeed reversing transmission comprising:

an input shaft that is drivable by a drive engine and rotatable about a rotational axis;

a drive shaft that is coaxially aligned with the input shaft and rotatable about the rotational axis and the drive shaft is functionally connectable with the input shaft, the drive shaft has a primary fixed gear that is rotationally fixed to the drive shaft so as to prevent relative rotation between the primary fixed gear and the drive shaft;

a forward-driving shaft is rotatable about a first axis and has a first fixed gear, a first loose gear and a first clutch, the first fixed gear is rotationally fixed to the forward-driving shaft so as to prevent relative rotation therebetween, the first loose gear is rotatable with respect to the forward-driving shaft, and the first loose gear is connectable, in a rotationally fixed manner, to the forward-driving shaft by engagement of the first clutch;

a reverse-driving shaft having is rotatable about a second axis and has a second fixed gear, a second loose gear and a second clutch, the second fixed gear is rotationally fixed to the reverse-driving shaft so as to prevent relative rotation therebetween, the second loose gear is rotatable with respect to the reverse-driving shaft, and the second loose gear is connectable in a rotationally fixed, manner to the reverse-driving shaft by engagement of the second clutch;

the primary fixed gear continuously meshes with the first and the second fixed gears, and the first and the second axes of the forward-driving and the reverse-driving shafts, respectively, are parallel to the rotational axis of the drive shaft; and the first clutch is arranged on the forward-driving shaft axially between the first fixed gear and the first loose gear, and the second clutch is arranged on the reverse-driving shaft axially between the second fixed gear and the second loose gear such that a clutch installation space is produced along the rotational axis adjacent the primary fixed gear in which a further clutch is accommodable.

12. The powershifting multispeed reversing transmission according to claim 11, wherein the further clutch is arranged in the clutch installation space axially adjacent the primary fixed gear, and the input shaft is connectable, in a rotationally fixed manner, to the drive shaft by engagement of the further clutch.

13. The powershifting multispeed reversing transmission according to claim 1, wherein the transmission is made without the converter lockup clutch for connecting the input shaft to the drive shaft.

* * * * *